(12) United States Patent
Kuji et al.

(10) Patent No.: US 10,315,596 B2
(45) Date of Patent: Jun. 11, 2019

(54) VEHICLE CLIP AND EXTERIOR COMPONENT FASTENING STRUCTURE

(71) Applicants: Toyota Jidosha Kabushiki Kaisha, Toyota-shi, Aichi-ken (JP); Nifco Inc., Yokosuka-Shi, Kanagawa (JP)

(72) Inventors: Kimihiro Kuji, Toyota (JP); Kensuke Fujiwara, Yokosuka (JP)

(73) Assignees: Toyota Jidosha Kabushiki Kaisha, Toyota-shi, Aichi-ken (JP); Nifco Inc., Yokosuka-Shi, Kanagawa (JP)

( * ) Notice: Subject to any disclaimer, the term of this patent is extended or adjusted under 35 U.S.C. 154(b) by 46 days.

(21) Appl. No.: 15/456,706

(22) Filed: Mar. 13, 2017

(65) Prior Publication Data
US 2017/0267196 A1 Sep. 21, 2017

(30) Foreign Application Priority Data
Mar. 16, 2016 (JP) .................................. 2016-052754

(51) Int. Cl.
| | | |
|---|---|---|
| B60R 19/24 | (2006.01) | |
| B62D 27/02 | (2006.01) | |
| F16B 5/06 | (2006.01) | |
| F16B 21/08 | (2006.01) | |

(52) U.S. Cl.
CPC ............ *B60R 19/24* (2013.01); *F16B 5/0614* (2013.01); *F16B 21/086* (2013.01); *B60R 2019/247* (2013.01); *Y10T 24/309* (2015.01)

(58) Field of Classification Search
CPC . B60R 19/24; B60R 2019/247; F16B 5/0614; F16B 5/0607; F16B 2005/0678; F16B 21/086; Y10T 24/44026; Y10T 24/30; Y10T 24/309
See application file for complete search history.

(56) References Cited

U.S. PATENT DOCUMENTS 5,695,296 A * 12/1997 Miura .................... B60R 19/24
403/2

FOREIGN PATENT DOCUMENTS

| JP | 2007-071368 A | 3/2007 |
|---|---|---|
| JP | 2012-086777 A | 5/2012 |

* cited by examiner

*Primary Examiner* — Robert Sandy
*Assistant Examiner* — Michael S Lee
(74) *Attorney, Agent, or Firm* — Dinsmore & Shohl LLP

(57) ABSTRACT

A vehicle clip includes: a clip body including an attachment section that has a pair of retention members for gripping a first exterior, and an insertion hole; and a pin member including an insertion portion that is anchored to the clip body in an inserted state of the insertion portion into the insertion hole and a through hole formed in a second exterior component, a head portion that is formed with a larger diameter than the insertion hole and that retains the second exterior component between the head portion and the clip body, and a pressing portion that extends out from the head portion toward the attachment section side, and that, through one of the retention members, presses the first exterior component toward the side of the other retention member in a state in which the insertion portion is anchored to the clip body.

3 Claims, 7 Drawing Sheets

VEHICLE CLIP AND EXTERIOR COMPONENT FASTENING STRUCTURE

CROSS-REFERENCE TO RELATED APPLICATION

This application is based on and claims priority under 35 USC 119 from Japanese Patent Application, No. 2016-052754 filed on Mar. 16, 2016, the disclosure of which is incorporated by reference herein.

BACKGROUND

Technical Field

The present disclosure relates to a vehicle clip and an exterior component fastening structure.

Related Art

Japanese Patent Application Laid-Open (JP-A) No. 2007-71368 describes a structure including a clip body and a pin as a vehicle clip for fastening together plural exterior components. In this structure, legs of the clip body are inserted through respective through holes formed in the plural exterior components, and the pin is press-fitted into the clip body 12, thereby increasing the diameter of the legs of the clip body and fastening the plural exterior components together. JP-A No. 2012-86777 similarly describes a vehicle clip in which fitting claws of a clip body are inserted in a state in which one exterior component is sandwiched by another exterior component, and then a push-in pin is pushed into the clip body so as to spread apart the fitting claws and fasten together the plural exterior components.

In the technology described in the above documents, the respective clip bodies are inserted in a state in which the plural exterior components have been superimposed and positioned, thus leaving room for improvement from the perspective of increasing the ease of assembly (work efficiency). Fastening structures are known in which, from the perspective of increasing the ease of assembly, a second exterior component is attached to a clip body using a pin or the like after the clip body has been attached to a first exterior component. However, it is difficult to secure fastening strength since the first exterior component and the second exterior component are not fastened together directly.

SUMMARY

In consideration of the above circumstances, the present disclosure provides a vehicle clip and exterior component fastening structure capable of securing fastening strength, while increasing ease of assembly.

A first aspect of the present disclosure is a vehicle clip including: a clip body including an attachment section that is provided with a pair of retention members for gripping a first exterior component so as to be attached to the first exterior component, and an insertion hole; and a pin member including an insertion portion that is anchored to the clip body in an inserted state of the insertion portion into the insertion hole and a through hole formed in a second exterior component, a head portion that is formed with a larger diameter than the insertion hole and that retains the second exterior component between the head portion and the clip body, and a pressing portion that extends out from the head portion toward the attachment section side, and that, through one of the retention members, presses the first exterior component toward the side of the other retention member in a state in which the insertion portion is anchored to the clip body.

In the present aspect, the vehicle clip includes the clip body and the pin member. The clip body includes the attachment section that is attached by gripping the first exterior component, and the insertion hole. The pin member includes the insertion portion that is anchored in an inserted state to the insertion hole of the clip body, and the head portion that is formed with a larger diameter than the insertion hole and that retains the second exterior component between the head portion and the clip body. This thereby enables the first exterior component and the second exterior component to be fastened together by retaining the second exterior component between the head portion and the clip body using the pin member after the clip body has been attached to the first exterior component. Namely, there is no need to directly superimpose and position the first exterior component and the second exterior component with respect to each other, enabling the ease of assembly to be improved.

The head portion of the pin member is provided with the pressing portion. The pressing portion presses the first exterior component toward the side of the other retention member through the one retention member in a state in which the insertion portion is anchored to the clip body. This thereby enables the retention force of the clip body with respect to the first exterior component to be increased, and enables the fastening strength between the first exterior component and the second exterior component to be secured. Note that the "fastening strength between the first exterior component and the second exterior component" referred to here refers to the difficulty of detaching the first exterior component from the second exterior component. Moreover, "enables the retention force to be secured" refers to being able to make detachment difficult (fasten firmly).

In this manner, the vehicle clip of the first aspect enables the fastening strength to be secured, while increasing the ease of assembly.

In the present aspect, a claw may be formed to at least one of the retention members; and the claw may be configured to engage with a recess that is formed to a location of the first exterior component to which the attachment section is attached.

In the configuration described above, the claw of the clip body engages with the recess of the first exterior component. Moreover, one retention member is pressed toward the side of the first exterior component by the pressing portion of the pin member, thereby enabling the retention force of the clip body with respect to the first exterior component to be further increased.

In this manner, the vehicle clip configured as described above enables the retention force of the clip body with respect to the first exterior component to be increased in comparison to configurations in which the attachment section is not formed with a claw.

In the present aspect, configuration may be made in which the insertion hole of the clip body is formed further to a vehicle inner side than the attachment section.

In the configuration described above, the insertion hole into which the pin member is inserted is formed further to the vehicle inner side than the attachment section. This thereby enables the pin member to be made less visible from the exterior of the vehicle.

In this manner, the vehicle clip configured as described above enables the design qualities of the vehicle to be improved.

A second aspect of the present disclosure is an exterior component fastening structure including: a clip body including an attachment section that is provided with a pair of retention members for gripping a first exterior component so as to be attached to the first exterior component, and an insertion hole; and a second exterior component including an insertion portion that is anchored to the clip body in an inserted state of the insertion portion into the insertion hole, and a pressing portion that extends out toward the attachment section side, and that, through one of the retention members, presses the first exterior component toward the side of the other retention member in a state in which the insertion portion is anchored to the clip body.

In the present aspect, through the one retention member, the pressing portion of the second exterior component presses the first exterior component toward the side of the other retention member in a state in which the insertion portion is anchored to the clip body. This thereby enables the retention force of the clip body with respect to the first exterior component to be increased, and enables the fastening strength between the first exterior component and the second exterior component to be secured. Moreover, since the insertion portion and the pressing portion are formed to the second exterior component, the number of components may be reduced in comparison to configurations employing, for example, a pin member that is a separate body.

In this manner, the exterior component fastening structure of the second aspect is capable of achieving both ease of assembly and of securing fastening strength, as well as enabling a reduction in the number of components.

BRIEF DESCRIPTION OF THE DRAWINGS

Embodiments of the present disclosure will be described in detail based on the following figures, wherein.

DETAILED DESCRIPTION

First Exemplary Embodiment

Explanation follows regarding a fastening structure employing a vehicle clip according to a first exemplary embodiment, with reference to FIG. 1 to FIG. 6. Note that in FIG. 1 to FIG. 6, the arrow Rr indicates a vehicle rear side, the arrow UP indicates a vehicle upper side, and the arrow IN indicates a vehicle width direction inner side. Unless specifically stated otherwise, reference to the front and rear, upward and downward, and left and right directions refers to the front and rear in a vehicle front-rear direction, upward and downward in a vehicle vertical direction, and the left and right when facing toward the direction of vehicle travel.

Figure 1:
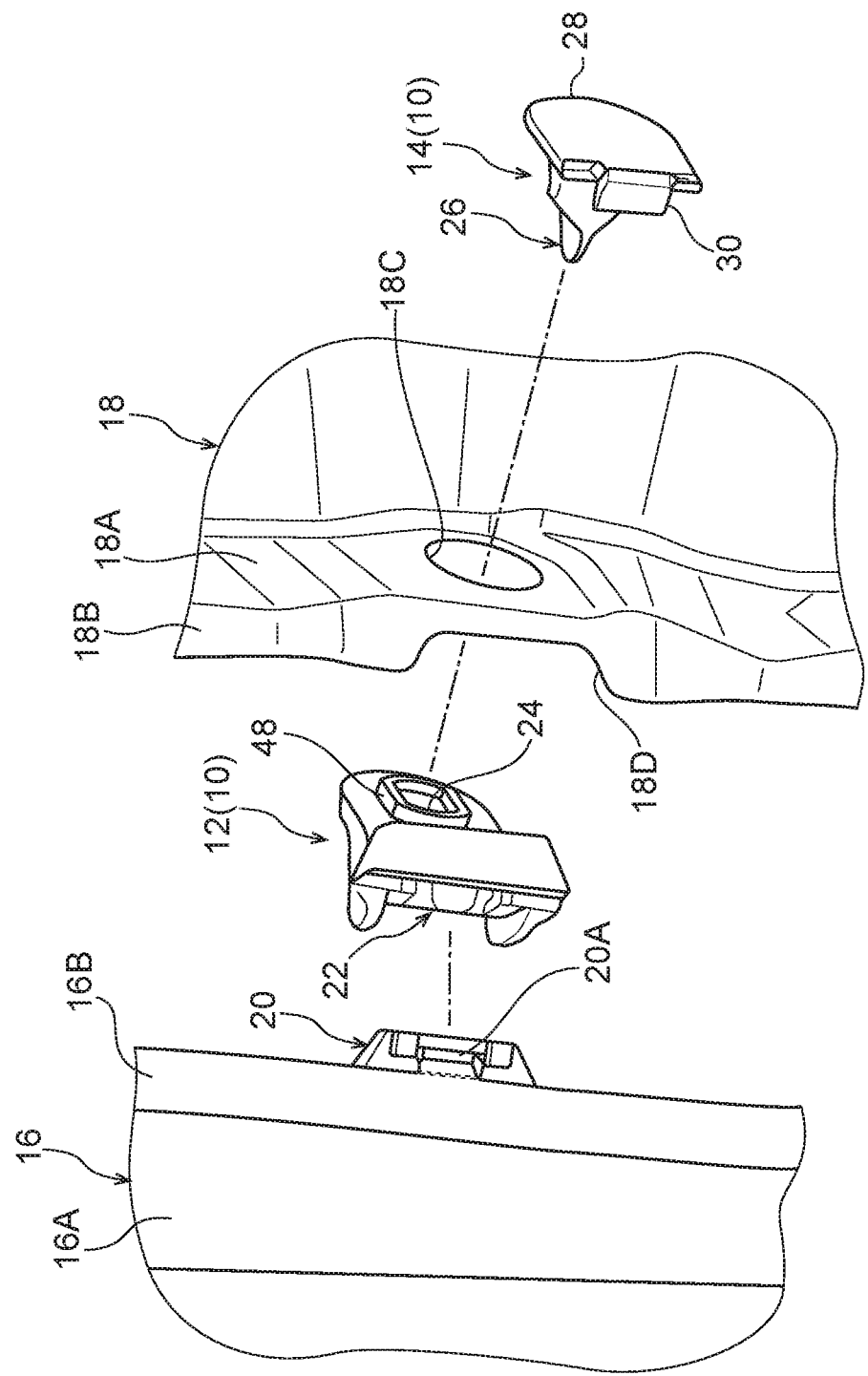
FIG. 1 is an exploded perspective view illustrating a fastening structure for a bumper and a fender liner according to a first exemplary embodiment.

Explanation follows regarding an exterior component fastening structure according to the present exemplary embodiment, in which as illustrated in FIG. 1, a bumper 16, serving as a first exterior component, and a fender liner 18, serving as a second exterior component, are fasted together by a vehicle clip 10 (referred to below as simply the "clip 10"). First, a brief explanation is given regarding the structures of the bumper 16 and the fender liner 18, followed by explanation regarding the structure of the clip 10 according to the present exemplary embodiment.

Schematic Configuration of the Bumper 16

The bumper 16 is an exterior component disposed at a front section of a vehicle, and extends along the vehicle width direction. Respective side walls 16A extend from both vehicle width direction ends of the bumper 16 toward the vehicle rear (in FIG. 1, only the side wall 16A on the vehicle left side of the bumper 16 is illustrated). Moreover, a fold-back portion 16B extends out from a rear end of each side wall 16A toward the vehicle width direction inner side. A bumper tab 20 to which a clip body 12 of the present exemplary embodiment attaches is formed to the fold-back portion 16B.

Figure 3:
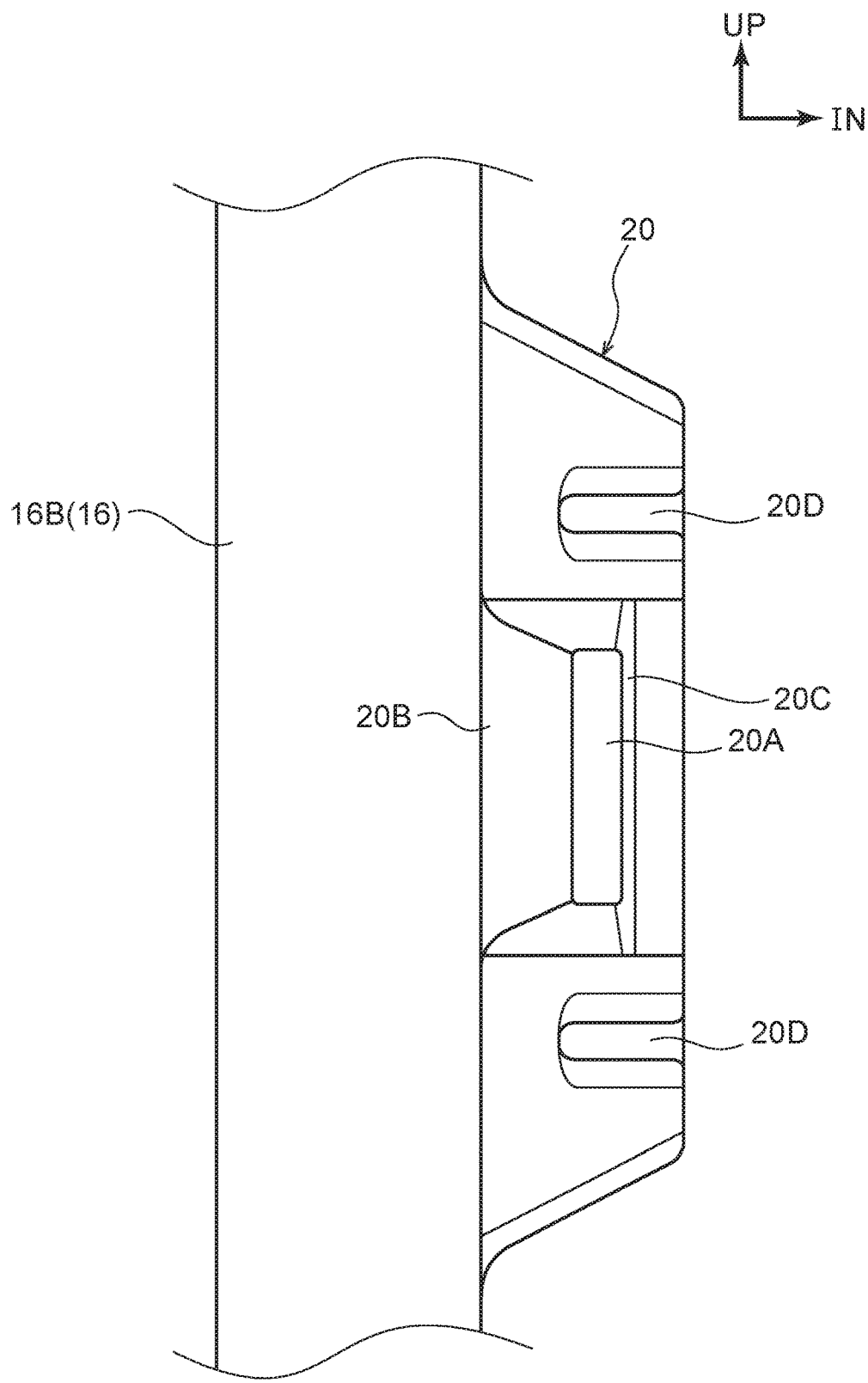
FIG. 3 is an enlarged view illustrating a bumper tab of the bumper according to the first exemplary embodiment.

As illustrated in FIG. 3, the bumper tab 20 is formed in a substantially trapezoidal shape with a vehicle vertical direction length that becomes shorter on progression toward the vehicle width direction inner side as viewed face-on (from the vehicle rear). An inclined face 20B inclining toward the vehicle front on progression from the fold-back portion 16B of the bumper 16 toward the vehicle width direction inner side is formed at a vehicle vertical direction intermediate portion of the bumper tab 20. A first recess 20A, serving as a recess, is formed at a leading end portion of the inclined face 20B. A claw 38A of the clip body 12, described later, engages with the first recess 20A. At the vehicle width direction inner side of the first recess 20A, a vertical wall 20C is formed extending out from the first recess 20A toward the vehicle rear. The claw 38A of the clip body 12 is anchored by the vertical wall 20C.

The bumper tab 20 is formed with second recesses 20D on both sides of the first recess 20A in the vehicle vertical direction. Each of the second recesses 20D extends from a vehicle width direction inner side end of the bumper tab 20 toward the vehicle width direction outer side. Each of the second recesses 20D is recessed toward the vehicle rear, similarly to the first recess 20A. Projections 44 of the clip body 12, described later, enter the respective second recesses 20D (see FIG. 6).

Schematic Configuration of the Fender Liner 18

As illustrated in FIG. 1, the fender liner 18 is an exterior component that is fastened to the bumper 16 through the clip 10, and is formed in a shape that covers an upper portion of a tire, not illustrated in the drawings. A front portion of the fender liner 18 is formed with a front wall 18A that is superimposed on the clip body 12, and a flange 18B extends out from a vehicle width direction outer side end portion of the front wall 18A toward the vehicle front.

A through hole 18C is formed in the front wall 18A, and a pin member 14, described later, is inserted through the through hole 18C. Moreover, a notch 18D corresponding to the shape of a base 34 configuring the clip body 12, described later, is formed in the flange 18B.

Structure of the Clip 10

Next, explanation follows regarding the structure of the clip 10 according to the present exemplary embodiment. The clip 10 of the present exemplary embodiment includes the clip body 12 and the pin member 14. Detailed explanation follows regarding the clip body 12 and the pin member 14 respectively.

Figure 4:
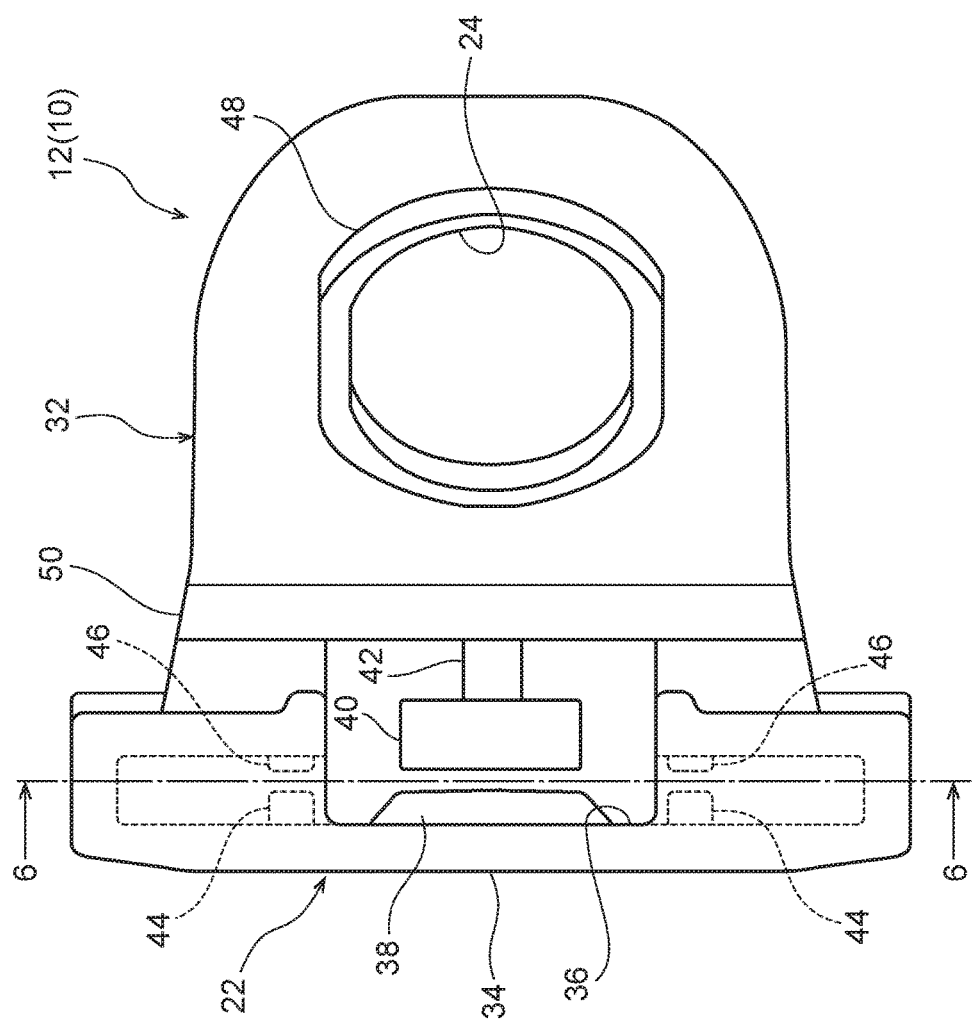
FIG. 4 is an enlarged view illustrating a clip body according to the first exemplary embodiment.

As illustrated in FIG. 4, the clip body 12 includes an attachment section 22 that attaches to the bumper tab 20, and a fender bearing section 32. The attachment section 22 includes the base 34 that has a substantially rectangular shape with its length direction along the vertical direction on the page. An opening 36 is formed at an intermediate portion of the base 34 in the vertical direction on the page, and a retention member 38 and a retention member 40 are provided as a pair inside the plane of the opening of the opening 36.

Figure 2:
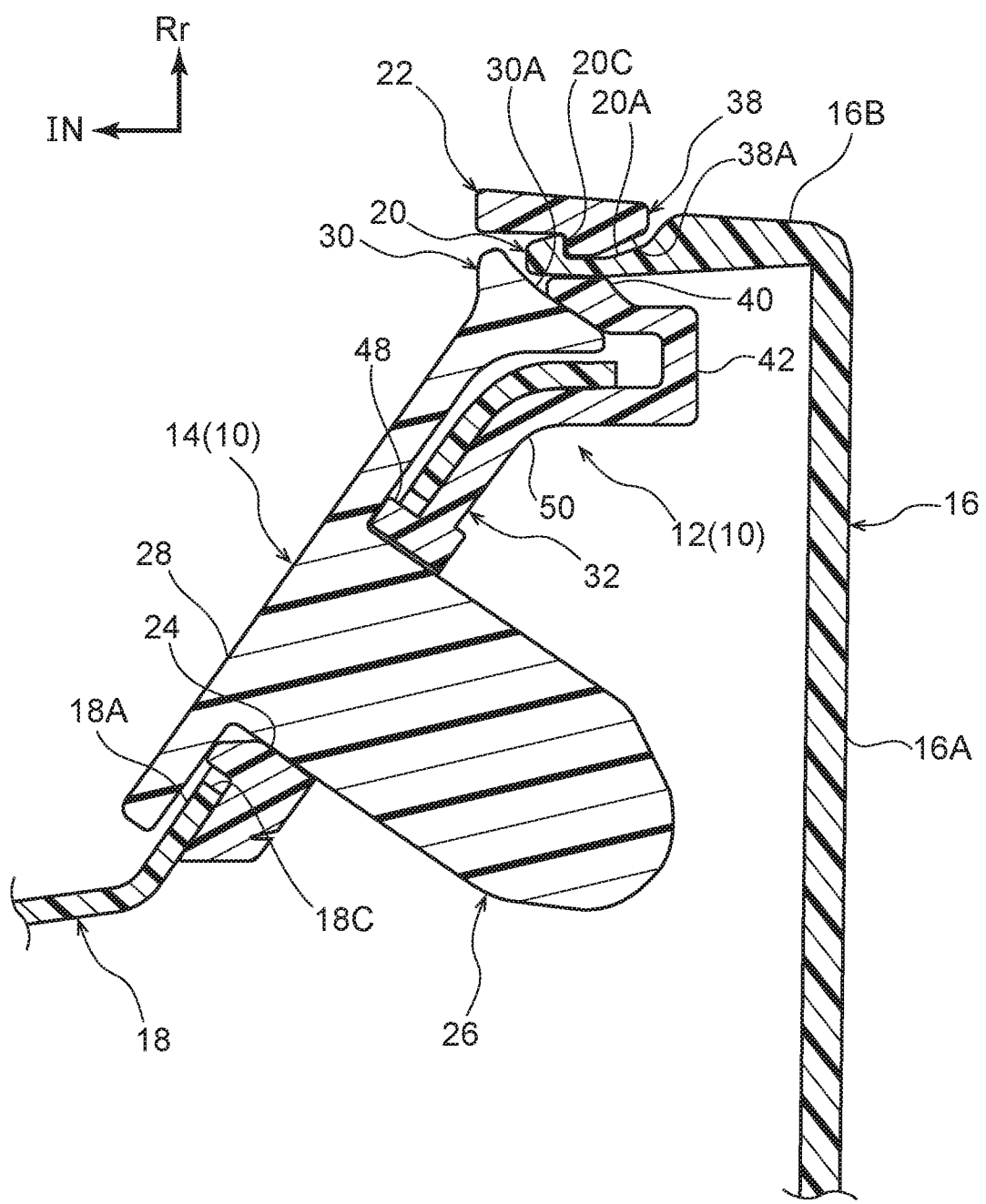
FIG. 2 is a cross-section illustrating the fastening structure for the bumper and the fender liner according to the first exemplary embodiment.

The retention member 38 extends out from an edge of the opening 36 on the left of the page to the inside in the plane of the opening, and, as illustrated in FIG. 2, the claw 38A is formed at a leading end portion of the retention member 38. The claw 38A engages with the first recess 20A of the bumper tab 20 in an attached state of the clip body 12 to the bumper tab 20. As illustrated in FIG. 4, the retention member 40 is provided at a leading end of a flexing tab 42 that extends out from an edge of the opening 36 on the right of the page to the inside in the plane of the opening. The flexing tab 42 extends out from a curved portion 50, described later. In the attached state of the clip body 12 to the bumper tab 20, the retention member 40 is positioned on the opposite side of the bumper tab 20 to the retention member 38, and presses the bumper tab 20 from the vehicle front side (see FIG. 2). In this manner, the attachment section 22 of the clip body 12 is attached by gripping the bumper tab 20 (bumper 16) between the retention member 38 and the retention member 40.

In the present exemplary embodiment, the flexing tab 42 is formed with a narrower width than the retention member 40, and is capable of undergoing flexing deformation. Accordingly, the flexing tab 42 flexes when attaching the attachment section 22 to the bumper tab 20.

Figure 6:
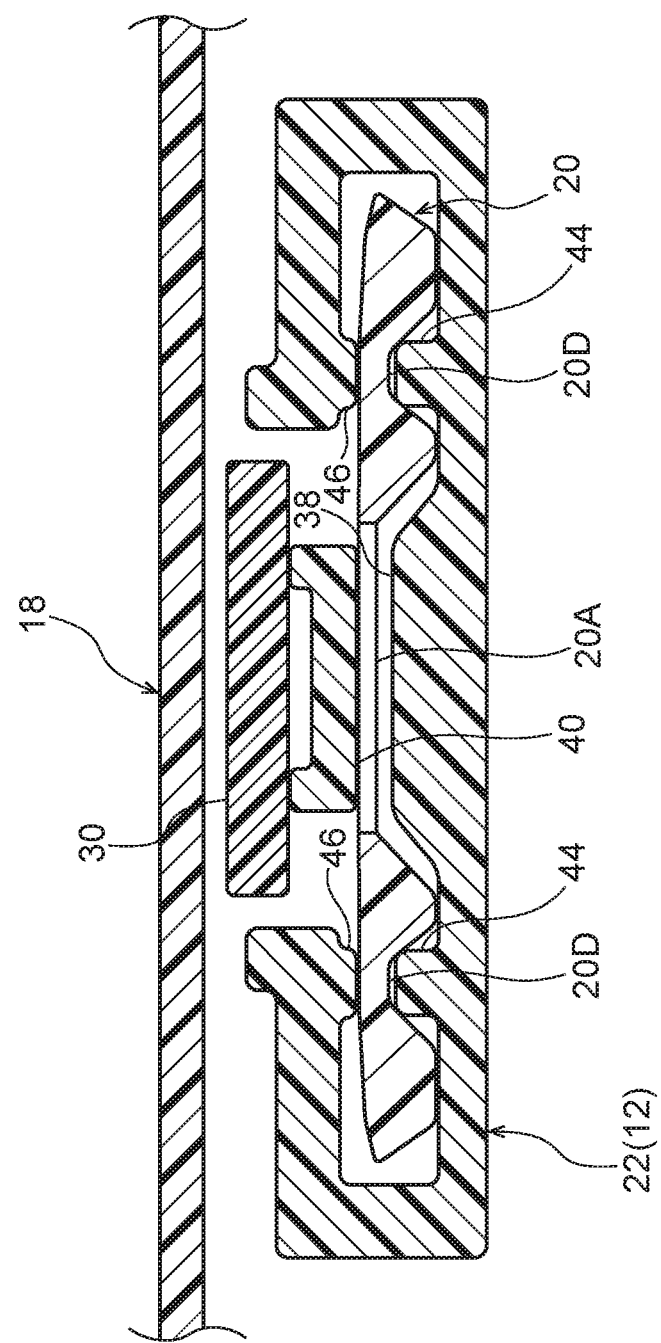
FIG. 6 is an enlarged cross-section illustrating a cross-section taken along line 6-6 in FIG. 4.

As illustrated in FIG. 4 and FIG. 6, the projecting projections 44 are provided on both sides of the retention member 38 in the length direction of the base 34. Projecting restraint portions 46 are provided on both sides of the retention member 40 in the length direction of the base 34. The respective projections 44 enter the second recesses 20D of the bumper tab 20 in the attached state of the clip body 12 to the bumper tab 20. In the attached state of the clip body 12 to the bumper tab 20, the respective restraint portions 46 are positioned on the opposite side of the bumper tab 20 to the projections 44, and press against the bumper tab 20.

As illustrated in FIG. 4, the fender bearing section 32 is formed to the base 34 at the right of the page. The fender bearing section 32 is integrally formed to the base 34, and a substantially circular insertion hole 24 is formed at a central portion of the fender bearing section 32. As illustrated in FIG. 2, the insertion hole 24 is formed further toward a vehicle front side and vehicle width direction inner side than the attachment section 22.

As illustrated in FIG. 4, a hole edge of the insertion hole 24 is formed with a guide rib 48. The guide rib 48 is formed around the entire circumference of the insertion hole 24, and projects out from a general portion of the fender bearing section 32 toward the near side on the page.

The fender bearing section 32 and the base 34 are coupled together through the curved portion 50. As illustrated in FIG. 2, in the attached state of the clip body 12 to the bumper tab 20, the curved portion 50 from the fender bearing section 32 toward the vehicle rear is curved toward the vehicle width direction inner side. The fender bearing section 32 is disposed so as to be inclined with respect to the vehicle front-rear direction in the attached state of the clip body 12 to the bumper tab 20.

Figure 5:
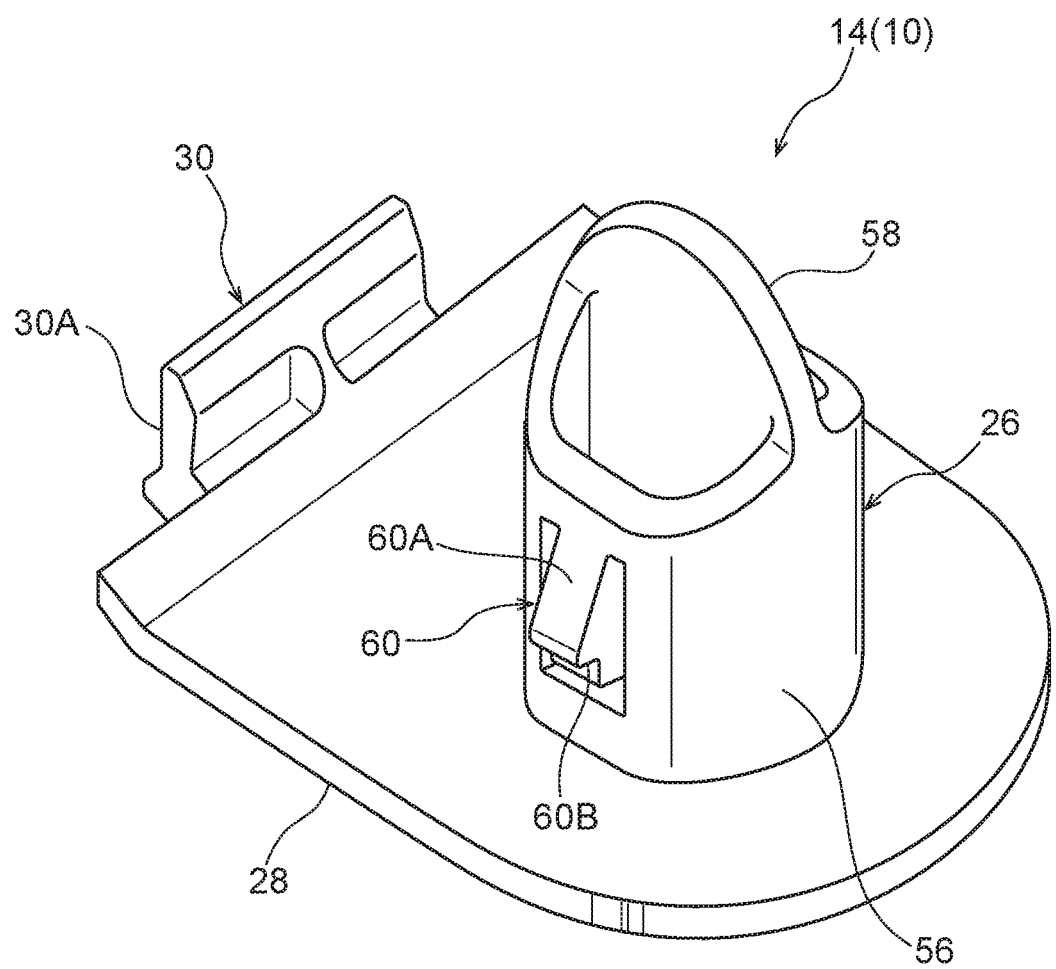
FIG. 5 is an enlarged view illustrating a pin member according to the first exemplary embodiment.

Next, explanation follows regarding the pin member 14. As illustrated in FIG. 5, the pin member 14 includes an insertion portion 26 that is inserted into the insertion hole 24, a head portion 28, and a pressing portion 30. The head portion 28 is formed in a flat plate shape, and, as illustrated in FIG. 2, is formed with a larger diameter than the insertion hole 24 of the fender bearing section 32. In an inserted state of the pin member 14 into the clip body 12, the head portion 28 retains the fender liner 18 sandwiched between the head portion 28 and the fender bearing section 32 of the clip body 12.

As illustrated in FIG. 5, the insertion portion 26 is provided projecting from one face of the head portion 28. The insertion portion 26 is integrally formed to the head portion 28, and includes an outer wall 56, an intermediate rib 58, and an anchor claw 60.

The outer wall 56 is formed in a substantially circular cylinder shape. The anchor claw 60 is formed at an outer peripheral face of the outer wall 56. The intermediate rib 58 is formed in a substantially flat plate shape so as to span between opposing locations on an inner peripheral face of the outer wall 56, and projects out further than the outer wall 56 in a direction away from the head portion 28. A leading end of the outer wall 56 is inclined toward a base side (the head portion 28 side) on progression away from the intermediate rib 58, so as to form a substantially mountain shape with the intermediate rib 58 at its apex.

The anchor claw 60 formed to the outer peripheral face of the outer wall 56 is provided with an inclined face 60A that projects further toward an outer side than the outer wall 56. The inclined face 60A is inclined so as to project out further toward the outer side on progression from the leading end side toward the base side of the outer wall 56. Moreover, an anchor face 60B is formed at an end portion on the head portion 28 side of the inclined face 60A so as to face the head portion 28. The periphery of the anchor claw 60 is cut away such that the anchor claw 60 has a cantilever structure that is only joined to the outer wall 56 at one end of the inclined face 60A (the upper end as it appears on the page). Accordingly, during insertion of the insertion portion 26 into the insertion hole 24 of the clip body 12, the inclined face 60A receives a reaction force from the edge of the insertion hole 24 and the anchor claw 60 flexes toward the inner side. When the anchor claw 60 has been fully inserted through the insertion hole 24, the anchor claw 60 recovers so as to achieve a structure in which the anchor face 60B prevents or suppresses the pin member 14 from being pulled out.

The pressing portion 30 is formed at an outer peripheral portion of the head portion 28. The pressing portion 30 is integrally formed to the head portion 28, and extends out in the thickness direction of the head portion 28. Moreover, as illustrated in FIG. 2, in a state in which the insertion portion 26 of the pin member 14 has been anchored to the clip body 12, the pressing portion 30 extends out toward the side of the attachment section 22, and a leading end of the pressing portion 30 enters between the curved portion 50 and the retention member 40. Moreover, the pressing portion 30 presses the bumper tab 20 through the one retention member 40 configuring the attachment section 22, toward the side of the other retention member 38. A contact face 30A of the pressing portion 30 that contacts the retention member 40 has a shape corresponding to that of the retention member 40, such that when this occurs, the contact face 30A and the retention member 40 make face contact with each other.

Next, explanation follows regarding an example of a procedure to fasten the bumper 16 and the fender liner 18 together using the clip 10.

First, the attachment section 22 of the clip body 12 is attached to the bumper tab 20 of the bumper 16. Specifically, as illustrated in FIG. 2, the clip body 12 is attached by gripping the bumper tab 20 between the retention member 38 and the retention member 40 of the attachment section 22. The bumper 16 is conveyed to the next process in this state.

Next, the fender liner 18 is assembled to a body, not illustrated in the drawings. When this is performed, the fender liner 18 may be assembled to the body using fastenings such as nuts and bolts, or the fender liner 18 may be assembled to the body using other clips or the like.

Following this, the bumper 16 is temporarily assembled to the body in the state in which the clip body 12 is attached to the bumper 16. The fender liner 18 is then set with respect to the clip body 12. Specifically, the guide rib 48 of the clip body 12 is inserted through and positioned with respect to the through hole 18C of the fender liner 18. When this is performed, the fender liner 18 is temporarily attached so as not to come away from the clip body 12.

Finally, the pin member 14 is inserted into the through hole 18C of the fender liner 18 and the insertion hole 24 of the clip body 12, and the pin member 14 is anchored to the clip body 12. The bumper 16 and the fender liner 18 are thereby fastened together using the above procedure.

Operation and Effects

Next, explanation follows regarding operation and advantageous effects of the clip 10 and the exterior component fastening structure according to the present exemplary embodiment.

As described above, the present exemplary embodiment enables the bumper 16 and the fender liner 18 to be fastened together by using the pin member 14 to attach the fender liner 18 to the clip body 12 after the clip body 12 has been attached to the bumper 16. Namely, the clip body 12 may be attached without having to directly superimpose and position the bumper 16 and the fender liner 18 with respect to each other. Moreover, in the anchored state of the insertion portion 26 of the pin member 14 to the clip body 12, the pressing portion 30 of the pin member 14 presses the bumper tab 20 toward the side of the retention member 38 through the retention member 40. This thereby enables the bumper tab 20 to be more firmly gripped between the retention member 40 and the retention member 38, increasing the retention force of the clip body 12 with respect to the bumper 16. The fastening strength between the bumper 16 and the fender liner 18 may accordingly be secured, thereby enabling both ease of assembly and fastening strength to be secured.

Moreover, in the present exemplary embodiment, the claw 38A of the retention member 38 engages with the first recess 20A of the bumper tab 20, and moreover, the retention member 40 is pressed toward the bumper tab 20 side by the pressing portion 30 of the pin member 14. This thereby enables the bumper tab 20 to be firmly held between the retention member 38 and the retention member 40. As a result, the retention force of the clip body 12 with respect to the bumper 16 may be increased in comparison to configurations in which the retention member 38 is not formed to the attachment section 22.

Moreover, in the present exemplary embodiment, the insertion hole 24 of the clip body 12, into which the pin member 14 is inserted, is formed further toward the vehicle inner side than the attachment section 22. This enables the pin member 14 to be made less visible from the exterior of the vehicle. As a result, the design qualities of the vehicle may be improved in comparison to configurations in which the pin member 14 is provided at a position where it may be seen easily.

Moreover, in the present exemplary embodiment, as illustrated in FIG. 6, the second recesses 20D of the bumper tab 20 are gripped between the projections 44 and the restraint portions 46 respectively formed to the base 34 of the clip body 12. This thereby enables the strength with respect to wrenching force or the like received from the fender liner 18 when the vehicle is traveling to be increased.

Moreover, in the present exemplary embodiment, as illustrated in FIG. 4, the flexing tab 42 that links the retention member 40 and the curved portion 50 together is formed with a narrower width than the retention member 40, and is configured capable of undergoing flexing deformation. This thereby enables the flexing tab 42 to be flexed when attaching the attachment section 22 to the bumper tab 20, enabling the force required for attachment to be reduced. Namely, the ease of attachment of the clip body 12 may be improved.

Moreover, in the present exemplary embodiment, the guide rib 48 is provided to the fender bearing section 32 of the pin member 14, thereby enabling easy positioning between the fender liner 18 and the clip body 12 prior to attaching the pin member 14. Moreover, the guide rib 48 of the present exemplary embodiment is formed thicker than the front wall 18A of the fender liner 18. This thereby enables application to other vehicle types in which the thickness of the fender liner 18 is thicker.

Second Exemplary Embodiment

Figure 7:
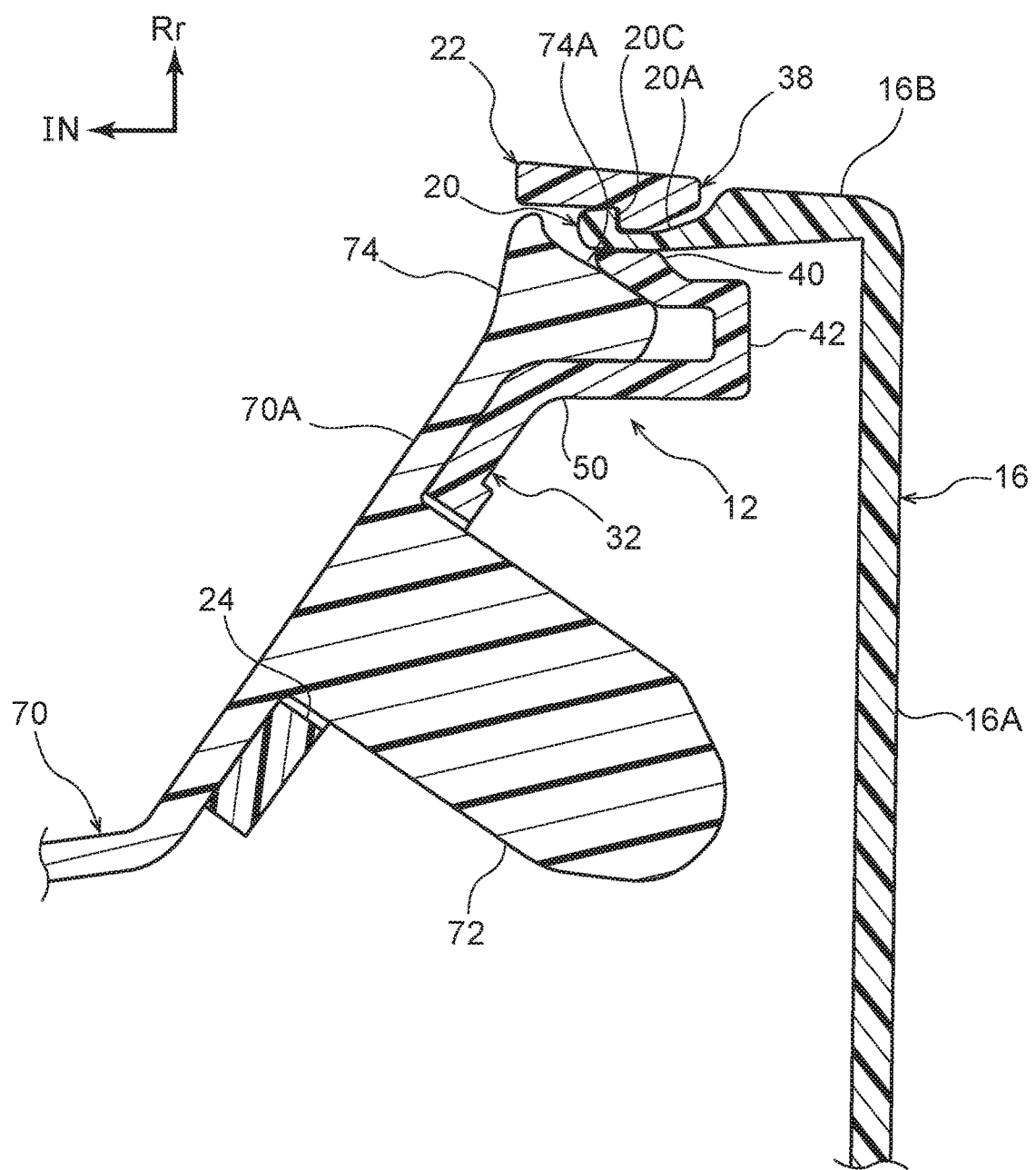
FIG. 7 is a cross-section corresponding to FIG. 2, illustrating a fastening structure for a bumper and a fender liner according to a second exemplary embodiment.

Next, explanation follows regarding an exterior component fastening structure according to a second exemplary embodiment, with reference to FIG. 7. Note that configurations similar to those of the first exemplary embodiment are allocated the same reference numerals, and explanation thereof is omitted.

As illustrated in FIG. 7, the fastening structure of the present exemplary embodiment differs from the first exemplary embodiment in the point that no pin member is provided, and a fender liner 70, serving as a second exterior component, includes the function of a pin member. Specifically, similarly to in the first exemplary embodiment, in the bumper 16, serving as a first exterior component, to which the clip body 12 is attached, the fold-back portion 16B extends out from a rear end of the side wall 16A toward the vehicle width direction inner side, and the bumper tab 20 is formed to the fold-back portion 16B.

The bumper tab 20 is formed with a recess 20A, and the retention member 38 configuring the attachment section 22 of the clip body 12 engages with the recess 20A. The retention member 40 configuring the attachment section 22 of the clip body 12 is disposed at the opposite face of the bumper tab 20 to the face formed with the recess 20A. The clip body 12 is attached to the bumper 16 such that the bumper tab 20 is gripped between the retention member 38 and the retention member 40. In FIG. 7, the insertion hole 24 is formed in the fender bearing section 32 of the clip body 12 similarly to in the first exemplary embodiment, but there is no guide portion formed at the hole edge of the insertion hole 24.

The fender liner 70 is attached to the clip body 12. The fender liner 70 includes a front wall 70A that is superimposed on the fender bearing section 32 of the clip body 12.

The front wall 70A includes an insertion portion 72 that projects out toward the clip body 12 side in a state in which the front wall 70A is superimposed on the fender bearing section 32, and that is inserted into the insertion hole 24. The insertion portion 72 is formed in a substantially circular cylinder shape, and is formed in a similar shape to the insertion portion 26 of the pin member 14 of the first exemplary embodiment (see FIG. 5). Moreover, the insertion portion 72 is formed with an anchor claw, not illustrated in the drawings. When the insertion portion 72 is inserted into the insertion hole 24, the anchor claw anchors to the fender bearing section 32 so as to achieve a structure in which the fender bearing section 32 is gripped between the front wall 70A and the anchor claw. This thereby prevents or suppresses the fender liner 70 from being pulled out.

The front wall 70A of the fender liner 70 is formed with a pressing portion 74. In a state in which the insertion portion 72 has been inserted into the insertion hole 24, the pressing portion 74 extends out from the front wall 70A toward the side of the attachment section 22 of the clip body 12, and enters between the curved portion 50 and the retention member 40 of the clip body 12. A contact face 74A at a vehicle rear side of the pressing portion 74 contacts the retention member 40, and presses the bumper tab 20 toward the side of the retention member 38 through the retention member 40.

Operation and Effects

Explanation follows regarding operation and advantageous effects of the vehicle clip 10 and exterior component fastening structure according to the present exemplary embodiment.

In the exterior component fastening structure according to the present exemplary embodiment, in the anchored state of the insertion portion 72 of the fender liner 70 to the clip body 12, the pressing portion 74 of the fender liner 70 presses the bumper tab 20 toward the side of the retention member 38 through the retention member 40 of the clip body 12. This thereby enables the bumper tab 20 to be more firmly gripped between the retention member 40 and the retention member 38, thereby increasing the attachment strength of the clip body 12 with respect to the bumper 16. This thereby enables the fastening strength between the bumper 16 and the fender liner 70 to be secured. Moreover, the insertion portion 72 and the pressing portion 74 are formed to the fender liner 70, thereby enabling a reduction in the number of components in comparison to configurations such as that of the first exemplary embodiment in which a pin member is employed.

Explanation has been given above regarding a first exemplary embodiment and a second exemplary embodiment of the present disclosure. However, various configurations may be implemented within a range not departing from the spirit of the present disclosure. For example, in the exemplary embodiments described above, explanation has been given regarding a fastening structure for a bumper and a fender liner. However, there is no limitation thereto, and application may be made to fastening structures for fastening other exterior components.

In the exemplary embodiments described above, the recess 20A is formed at a vehicle rear face of the bumper tab 20; however, there is no limitation thereto. For example, a structure may be configured without forming the recess 20A. In such cases, a protrusion or the like may be formed on the bumper tab 20, and engaged with a recess formed on the side of the attachment section 22 of the clip body 12. Moreover, a structure may be configured with recesses formed on both faces of the bumper tab 20. In such cases, a structure that detaches even less readily may be achieved by further providing a claw on the retention member 40 configuring the attachment section 22 of the clip body 12.

Moreover, in the exemplary embodiments described above, the insertion hole 24 is formed further toward the vehicle inner side than the attachment section 22 of the clip body 12. However, there is no limitation thereto, and the positional relationship between the attachment section 22 and the insertion hole 24 may be modified as appropriate.

Moreover, in the exemplary embodiments described above, the pressing portion is integrally formed to the pin member 14 or the fender liner 70; however, there is no limitation thereto. For example, in FIG. 5, the pressing portion 30 may be joined to the head portion 28 of the pin member 14 using fastenings such as nuts and bolts, or may be joined using an adhesive or the like.

As illustrated in FIG. 7, in the second exemplary embodiment, the insertion portion 72 is formed integrally to the fender liner 70; however, there is no limitation thereto. For example, the insertion portion 72 may be formed as a separate body, and joined to the fender liner 70 using fastenings such as nuts and bolts, or using an adhesive or the like. In such cases, the present disclosure may also be applied to existing fender liners.

What is claimed is:

1. A vehicle clip comprising:
 a clip body comprising an attachment section that comprises a pair of retention members for gripping a first exterior component so as to be attached to the first exterior component, and an insertion hole; and
 a pin member comprising
  an insertion portion that is anchored to the clip body in an inserted state of the insertion portion into the insertion hole and a through hole formed in only a second exterior component,
  a head portion that is formed with a larger diameter than the insertion hole and that retains the second exterior component between the head portion and the clip body, and
  a pressing portion that extends out from the head portion toward an attachment section side, and that abuts one of the retention members to press the first exterior component toward the side of the other retention member in a state in which the insertion portion is anchored to the clip body.

2. The vehicle clip of claim 1, wherein:
 a claw is formed to at least one of the retention members; and
 the claw is configured to engage with a recess that is formed to a location of the first exterior component to which the attachment section is attached.

3. The vehicle clip of claim 1, wherein the insertion hole of the clip body is formed further to a vehicle inner side than the attachment section.

* * * * *